No. 845,280.  
PATENTED FEB. 26, 1907.

C. M. THRASHER.  
NUT LOCK.  
APPLICATION FILED DEC. 22, 1906.

Witnesses

Inventor  
C. M. Thrasher,  
By R. H. A. Lacey  
Attorneys

UNITED STATES PATENT OFFICE.

CHARLES M. THRASHER, OF ROCKY, OKLAHOMA TERRITORY.

NUT-LOCK.

No. 845,280.

Specification of Letters Patent.

Patented Feb. 26, 1907.

Application filed December 22, 1906. Serial No. 349,125.

*To all whom it may concern:*

Be it known that I, CHARLES M. THRASHER, a citizen of the United States, residing at Rocky, in the county of Washita and Territory of Oklahoma, have invented certain new and useful Improvements in Nut-Locks, of which the following is a specification.

This invention contemplates certain new and useful improvements in nut-locks; and the object of my invention is to provide a very simple, cheap, and efficient construction of nut-lock by which a nut will be securely held in place as against accidental displacement and prevented from working off, while at the same time provision is made for removing the nut whenever it is desired to do so.

With this and other objects in view, as will more fully appear as the description proceeds, the invention consists in certain constructions and arrangements of the parts hereinafter described and claimed.

For a full description of the invention and the merits thereof and also to acquire a knowledge of the details of construction of the means for effecting the result reference is to be had to the following description and accompanying drawings, in which—

Figure 1:
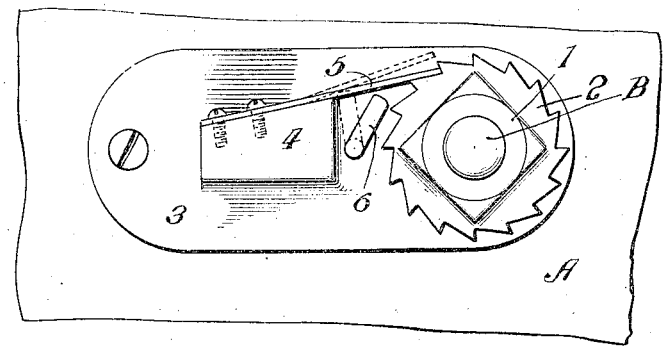
Figure 2:
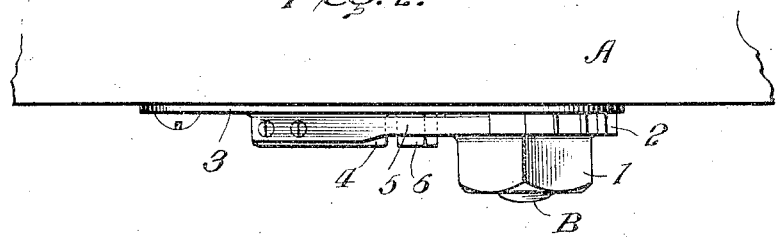
Figure 3:
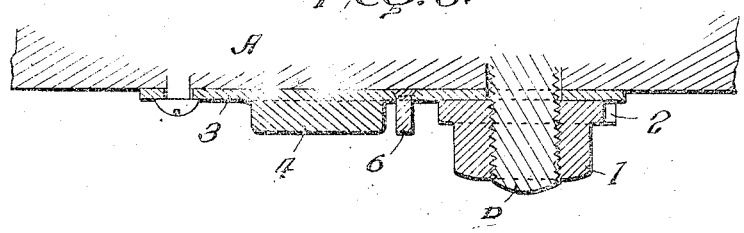

Figure 1 is the face view illustrating my improved nut-lock. Fig. 2 is an edge view thereof, and Fig. 3 is a horizontal sectional view.

Corresponding and like parts are referred to in the following description and indicated in all the views of the drawings by the same reference characters.

Referring to the drawings, the letter A designates the parts to which my improved nut-lock is applied, and B the bolt.

The improved nut of my invention is designated 1 and is provided with a ratchet-flange 2. The nut itself is square or otherwise polygonal in shape, so that a wrench may be applied thereto and screw it upon the bolt B.

3 designates a washer which is adapted to be placed over the bolt and to be interposed between the nut and the part A. This washer is elongated or extended at one side, as shown, and is provided in its extension with a swelled portion 4, one edge of which constitutes a supporting-ledge, to which one end of a spring-pawl is attached by any suitable means. The free end of the pawl is adapted to extend into engagement with the teeth of the circular ratchet-flange 2.

In practicing my invention the washer 3 is preferably secured first to the part to which the invention is to be applied, being held in place by rivets, screws, or other similar fastening devices, with the opening through the washer in alinement with the opening or aperture of the part to be held in place by the improved nut-lock. The bolt B is then inserted through these registering apertures, and the nut is then applied and is screwed up by any tool, such as a wrench. As it is screwed up it is manifest that the teeth of the ratchet-flange 2 will slip over the free end of the spring 5, and the said end of the spring will prevent the nut from turning backwardly. Whenever it is desired to unlock the nut, this may be done by an unlocking device 6 which I have provided, the same being mounted to turn within the washer 3 and provided with a wing adapted to be swung up into engagement with the spring 5, so as to carry the same out of engagement with the ratchet-flange 2. It is to be noted that the arrangement of the parts is such that the unlocking device 6 may rest against the side edge of the swelled portion 4 when it holds the spring 5 in released position, so as to support the spring and maintain it out of engagement with the ratchet-flange without the necessity of holding the unlocking device while the nut is being removed.

From the foregoing description, in connection with the accompanying drawings, it will be seen that I have provided a very simple construction of nut-lock which comprises comparatively few parts and will securely hold the nut against a backward movement after it has been screwed up, while at the same time provision is made for unlocking the nut whenever desired.

Having thus described the invention, what is claimed as new is—

The combination with a bolt and part to which it is attached, of a washer adapted to be placed over said bolt and secured to the said part, said washer being provided with a swelled portion one side of which constitutes a ledge, a spring-pawl secured at one end to said ledge, a nut adapted to work on said bolt and having a ratchet for engagement by said pawl, and an unlocking device journaled on said washer and provided with a wing adapted to be swung against the pawl whereby to carry it out of engagement with
5 the ratchet, said wing being arranged to rest against the side edge of the said swelled portion and hold the pawl disengaged.

In testimony whereof I affix my signature in presence of two witnesses.

CHARLES M. THRASHER. [L. S.]

Witnesses:
D. L. BURSON,
W. A. MCATEE.